United States Patent [19]

Hillman et al.

[11] Patent Number: 5,142,119
[45] Date of Patent: Aug. 25, 1992

[54] LASER WELDING OF GALVANIZED STEEL

[75] Inventors: Thomas J. Hillman, Clarkston; G. M. Ali Hyder, Madison Heights, both of Mich.

[73] Assignee: Saturn Corporation, Tro, Mich.

[21] Appl. No.: 669,569

[22] Filed: Mar. 14, 1991

[51] Int. Cl.⁵ .............................................. B23K 26/00
[52] U.S. Cl. ......................... 219/121.64; 219/121.63; 219/121.84
[58] Field of Search ...................... 219/121.63, 121.64, 219/121.84

[56] References Cited

U.S. PATENT DOCUMENTS

| | | | |
|---|---|---|---|
| 4,000,392 | 12/1976 | Banas et al. | 219/121.64 |
| 4,467,171 | 8/1984 | Ramos | 219/121.67 |
| 4,992,643 | 2/1991 | Fuerschbach et al. | 219/121.63 |

*Primary Examiner*—C. L. Albritton
*Attorney, Agent, or Firm*—George A. Grove

[57] ABSTRACT

A continuous laser beam welding process is provided in which galvanized steel sheet members having buried zinc-coated bonding surface regions are welded in an oxygen-enriched region, reducing the porosity in the product weld nugget.

3 Claims, 2 Drawing Sheets

LASER WELDING OF GALVANIZED STEEL

FIELD OF THE INVENTION

This invention relates in general to a process of continuously laser beam welding of overlapping galvanized sheet steel members with buried zinc-coated surfaces so as to reduce the zinc vapor porosity within the weld nugget.

BACKGROUND OF THE INVENTION

This invention relates to a continuous laser beam welding process for galvanized steel sheet members and, more particularly, to such galvanized steel laser welding process carried out in the presence of an oxygen rich cover gas to reduce zinc vapor porosity within the weld nugget.

In a common laser welding process, metal members are assembled with bonding surfaces in juxtaposition, for example, to form a lap joint, and one outer surface is scanned with a continuous laser beam to melt and fuse the members at the bonding surfaces. In contrast to other welding processes such as electrical resistance welding that generate heat concentrated at the bonding surfaces, laser welding heats a zone extending from the irradiated surface down below the touching surfaces to create a pool of molten metal within both members and that, upon solidification, forms the weld nugget that joins the two sheet members together. In order to minimize oxidation of the molten surface, it has heretofore been common practice to protect the irradiated surface using an inert cover gas such as helium.

In general, galvanized steel sheet comprises a low carbon steel core sheet coated with a metallic zinc plate to enhance corrosion protection. We have found that a problem is created during laser welding of two side-galvanized steel sheets positioned for a lap joint or the like. We have seen this problem whether we weld under an inert gas atmosphere or in air. The problem is the weld track is porous, brittle and weak.

We think that this problem arises because of vaporization of the zinc coating at the pressed-together bonding surfaces at temperatures below the temperature required to fuse the steel. At the outer surface which receives the incident laser beam, the zinc vapor is simply expelled into the atmosphere by the energy of the beam and does not affect the quality of the weld. However, the zinc vapor generated by the heated coating at the submerged lapped bonding surfaces is entrapped within the molten steel. The gas tries to flow through the molten metal and expel molten metal from the weld track, which generates pores within the weld nugget and weakens the joint.

We have discovered that such laser welding of galvanized steel members in the presence of an oxygen-enriched cover gas significantly reduces zinc vapor porosity and irregular cuts in the weld nugget. This is attributed to reaction between the oxygen and the zinc vapor that produces solid zinc oxide that becomes harmlessly dispersed throughout the weld metal. It is also attributed to the surface tension of the molten pool being favorably affected by the presence of oxygen, which helps to minimize vapor expulsion. The formation of a weld nugget that is substantially pore free using oxygen cover gas is in dramatic contrast to the porous nuggets formed using inert cover gas or even air.

Therefore, it is an object of this invention to provide an improved laser welding process for joining lapped steel sheet members, at least one of which comprises a buried galvanized bonding surface, to produce a strong, substantially pore-free weld nugget.

SUMMARY OF THE INVENTION

In its broad aspect, this invention is directed to a process for continuously laser welding of galvanized steel sheet members, coated with a zinc plate to enhance corrosion, in the presence of an oxygen-rich cover gas which reduces the porosity within the weld nugget. The process of the invention comprises:

(1) arranging the zinc-coated members to provide intimate contact between the bonding surface regions, (2) exposing the outer surface of the upper member to laser irradiation, thus heating, melting and fusing said members at the bonding surface regions, while enveloping the laser-welded region in an oxygen-enriched gas during laser irradiation, reducing porosity in the product weld nugget.

By thus laser welding in an oxygen-enriched environment, we produce strong, substantially pore-free weld track. While we are not sure as to why the oxygen-enriched environment produces superior welds, we think that it is due to the reaction of the zinc vapor with oxygen and/or to the improvement of the surface tension of the weld pool to minimize vapor expulsion.

DESCRIPTION OF THE DRAWINGS

The present invention will be further illustrated with reference to the drawings wherein.

Following is a detailed description of our invention.

DESCRIPTION OF THE INVENTION

Figure 1:
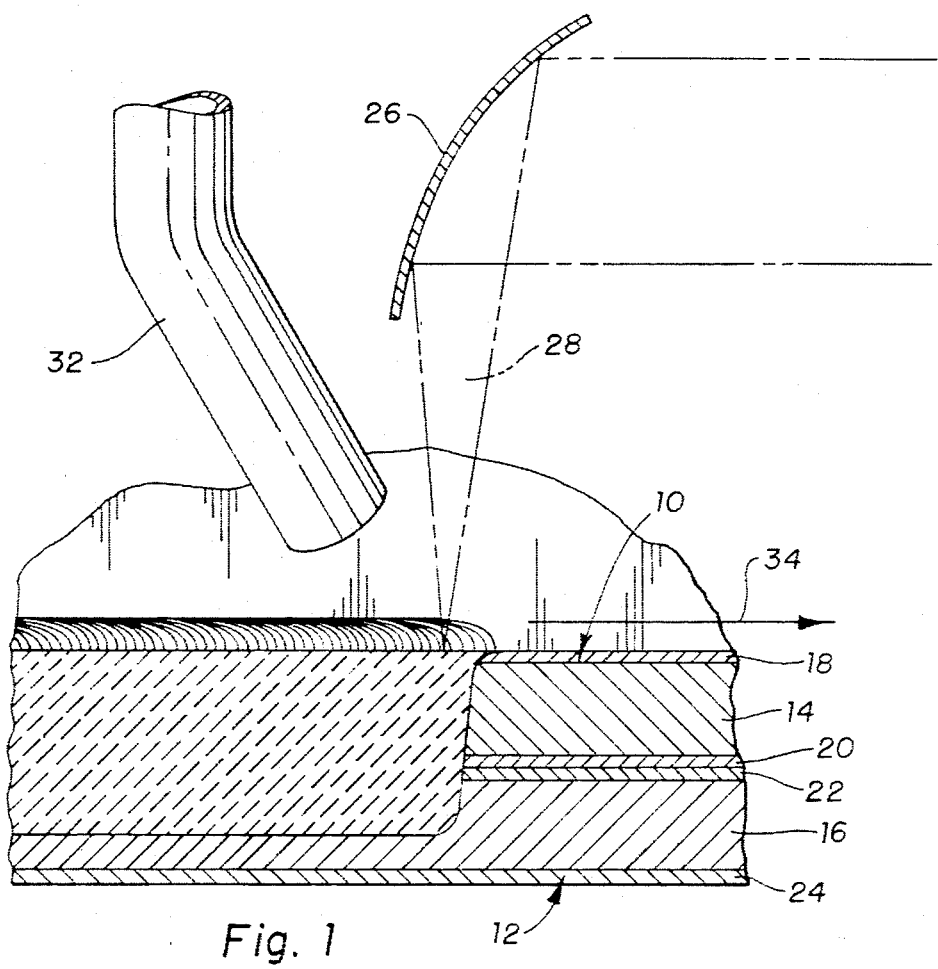
FIG. 1 is a partly cross sectional and partly schematic, somewhat enlarged view of a lap joint between galvanized steel members being laser welded in accordance with this invention.

In a preferred embodiment, this invention is employed for producing high integrity weld joints between two side-galvanized sheet steel members 10 and 12 (see FIG. 1). Members 10 and 12 may be distinct components positioned for a lap joint or the like, or distinct sections of a singular component bent or otherwise formed to bring the sections into overlapping proximity for joining, for example, in the manufacture of a tube. Members 10 and 12, respectively, comprise low carbon steel cores 14 and 16 and have metallic zinc coatings 18, 20, 22 and 24 on both faces thereof. Members 10 and 12 each have a thickness of about 0.035 inch, whereas galvanized coating layers 18, 20, 22 and 24 each have a thickness of about 0.005 inch.

Members 10 and 12 are shown in an overlapping juxtaposed position suitable for a lap weld. We carried out our welding experiments using a continuous wave carbon dioxide laser apparatus (not shown), commercially available, e.g., from Rofin-Sinal under the designation Model RF 825 having a three kilowatt power rating. The laser apparatus was suitably positioned above the assembled workpiece and adapted to be moved over the surface so as to generate a continuous or discontinuous weld track. The apparatus generates a laser beam 28 focused by its 7.5 inch focal length parabolic mirror 26. Beam 28 is directed onto the zinc-coated upper surface 18 of member 10, which is positioned so that the focal point of mirror 26 is about 0.06 inch below surface 18 of the metal. High energy laser beam 28 is approximately 0.01 inch in diameter. Note that the focal point is located below the upper sheet and about two-thirds into the lower sheet.

We provide a tank or other suitable source (not shown) of oxygen gas. The oxygen is led from the source to the laser beam weld site by a tube, the end of which is seen in FIG. 1 as tube 32. Thus, tube 32 floods the weld site with oxygen. The flooded oxygen site is enriched in oxygen content as compared to the ambient environment. We do not know the precise oxygen concentration at the weld site but know that it is appreciably higher than that of the oxygen content of air because the welds that we produce by this oxygen-enhancing practice are markedly superior and less porous than welds produced in air with the same laser apparatus and the same galvanized steel workpieces. We provide for relative movement between the workpieces to be joined and the laser beam 28 and the oxygen delivery tube 32. Either or both may be moved so long as a suitable weld track is obtained.

In general, a preferred practice is for tube 32 to follow immediately behind the laser weld beam 28 as it is moved over the surface to be welded.

Figure 2:
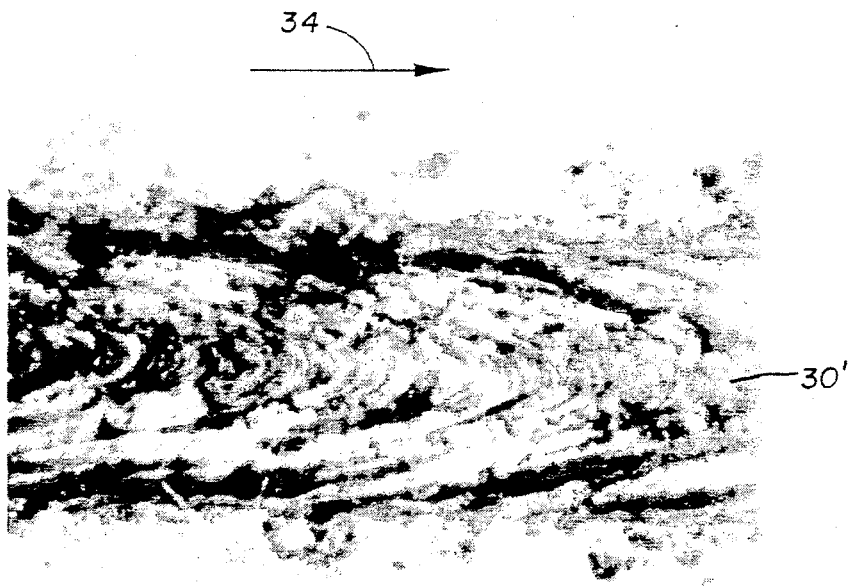
FIG. 2 is a photomicrograph at 25×magnification of the top surface (i.e., laser beam incident surface) of the weld nugget track of a laser weld joining galvanized steel members, which weld was formed using oxygen cover gas in accordance with this invention.

Thus, during the welding operation, beam 28 is advanced in the direction of the arrow 34, as shown in FIGS. 1 and 2; preferably the incident beam is perpendicular to the upper workpiece member 10 so that the weld area better absorbs the full energy of the beam. The intensity of the beam 28 and the rate at which the beam is advanced are adjusted so that the beam 28 heats the surface sufficiently to produce a weld nugget that extends from the top of coating 18, through member 10 and coatings 20 and 22 and significantly, approximately two-thirds of the depth, into into second member 12.

Although the molten metal that eventually forms the weld nugget 30 seems quite massive as illustrated in FIG. 1, it is in this example actually quite narrow—about 1/16 inch wide. The width of a weld track depends on the width and energy of the laser beams, its rate of movement, and the like. Thus, the pool of molten metal created by the laser beam is quickly quenched and solidified by the surrounding mass of the steel sheets after the laser has moved on. However, as we will show below, the presence of the oxygen-enriched atmosphere in the weld site materially improves the resultant weld nugget track.

Referring to FIG. 1, there is shown a welded joint 30 formed between member 10 and zinc coatings 20 and 22 and second member 12.

Referring to FIG. 2, there is shown an enlarged photograph of a welded joint 30'. The joint is seen to be fully solidified and substantially free of pores, craters or cracks. The direction of movement of the laser beam is perceptible as is shown by the solidification lap marks perceptable in FIG. 2. The example depicted in FIG. 2 represented an acceptable weld using oxygen-enriched air at 45 SCFH and moving the laser at 90 IPM.

Figure 3:
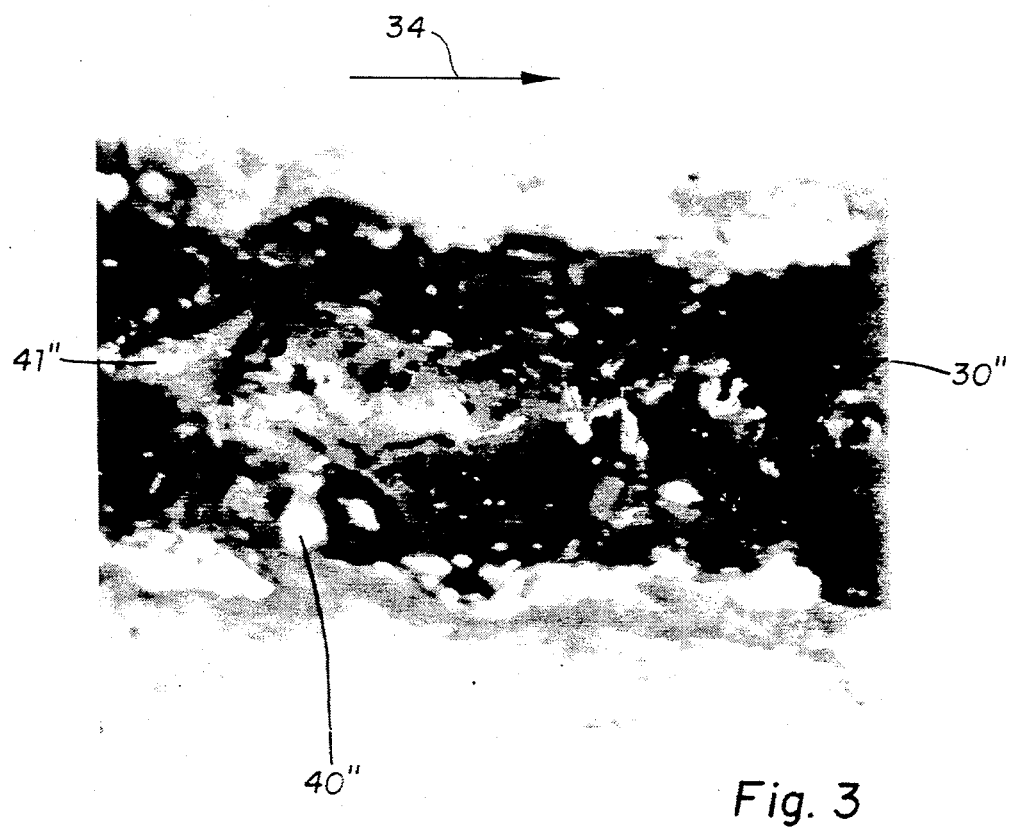
FIG. 3 is a photomicrograph at 25×magnification of a laser weld surface between galvanized steel members similar to the weld in FIG. 2, but formed using helium as the cover gas.
Figure 4:
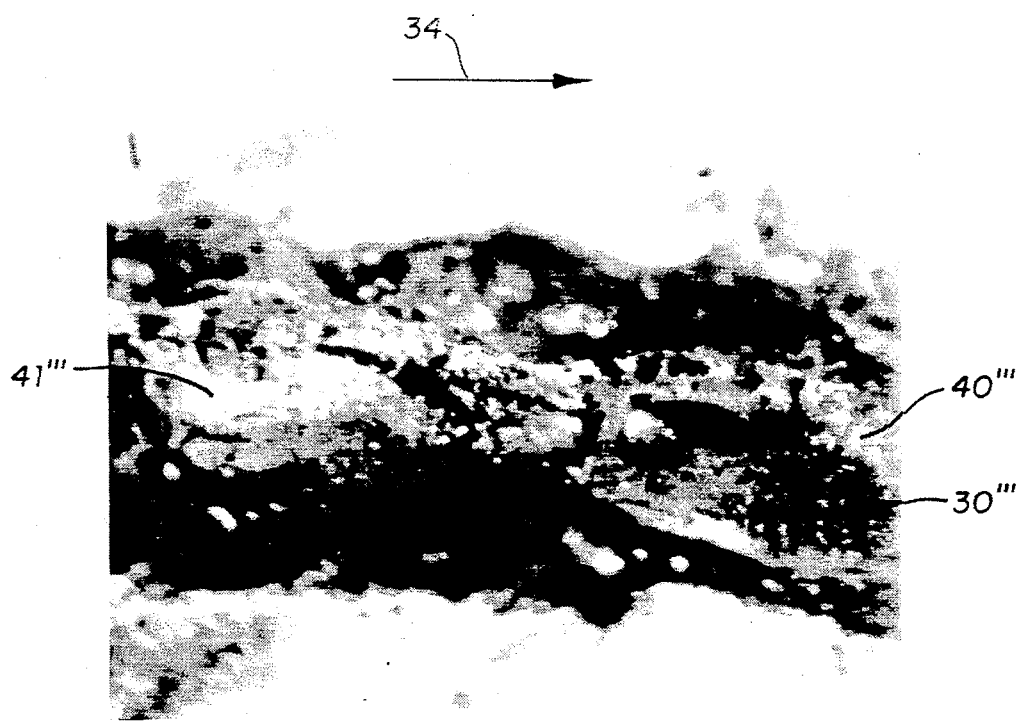
FIG. 4 is a photomicrograph at 25×magnification of a laser weld surface between galvanized steel members similar to the weld in FIG. 2, but welded in air.

FIGS. 3 and 4 show enlarged photographs of typical weld joints 30" and 30''' using helium and air as a cover gas, respectively. The flow rate of the gas was 45 SCFH, and the laser speed was 90 IPM, as was the welding condition for FIG. 2. Pores 40" and 40''' and craters 41" and 41''' are shown in FIGS. 3 and 4, respectively. Thus, in our comparative weld experiments, the weld surface experienced the same gas movement except one time helium, the other air and the last oxygen.

While our invention has been described in terms of certain embodiments thereof, it will be appreciated that other forms could be readily adapted by those skilled in the art. Accordingly, the scope of the invention is to be considered limited only by the following claims.

The embodiments of the invention in which an exclusive property or privilege is claimed are defined as follows:

1. In a method for laser welding galvanized steel sheet members having zinc-coated bonding surface regions, said method comprising arranging the members to provide intimate contact between the bonding surface regions and to expose an outer surface region of one said member opposite the bonding region to laser irradiation, and directing a laser beam onto the exposed region to heat and fuse said members at said bonding regions and thereby form a weld nugget joining said members, the improvement comprising enveloping the exposed region in an oxygen-enriched gas during laser heating to reduce porosity in the product weld nugget.

2. A method for laser welding galvanized steel sheet members having bonding surface regions that carry the zinc galvanized coating, said method comprising arranging the members in preparation for welding to provide intimate contact between the bonding surface regions and to expose an outer surface region of one said member opposite the bonding region to laser irradiation, flooding the surface region to be welded with oxygen gas through a tube onto the surface, and directing a laser beam onto the flooded surface to heat a zone of said members extending from the exposed region to the bonding region and to thereby fuse said members at said bonding regions to form a pore-free weld nugget joining said members.

3. A method for laser welding galvanized steel sheet members having bonding surface regions that carry the zinc galvanized coating, said method comprising arranging the members in preparation for welding to provide intimate contact between the bonding surface regions and to expose an outer surface region of one said member opposite the bonding region to laser irradiation, flooding the surface region to be welded with oxygen gas through a tube, and directing a laser beam onto the flooded surface to heat a zone of said members extending from the exposed region to the bonding region by moving the tube that supplies the oxygen and the laser irradiation beam in tandem, and thereby fuse said members at said bonding regions to form a pore-free weld nugget joining said members.

* * * * *